(12) United States Patent
Kai et al.

(10) Patent No.: US 7,422,237 B2
(45) Date of Patent: Sep. 9, 2008

(54) AIR BAG DEVICE

(75) Inventors: Takeshi Kai, Wako (JP); Daiei Tonooka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 11/460,441

(22) Filed: Jul. 27, 2006

(65) Prior Publication Data

US 2007/0024040 A1 Feb. 1, 2007

(30) Foreign Application Priority Data

Jul. 28, 2005 (JP) ............................. 2005-219252

(51) Int. Cl.
*B60R 21/233* (2006.01)

(52) U.S. Cl. ..................... 280/740; 280/729; 280/742

(58) Field of Classification Search ................ 280/740, 280/736, 732, 731, 729, 742
See application file for complete search history.

(56) References Cited

U.S. PATENT DOCUMENTS

| | | | | |
|---|---|---|---|---|
| 5,186,489 A * | 2/1993 | Imai | ................ | 280/728.2 |
| 5,492,362 A * | 2/1996 | Lehman et al. | ............. | 280/739 |
| 5,560,649 A * | 10/1996 | Saderholm et al. | ....... | 280/743.1 |
| 5,573,270 A * | 11/1996 | Sogi et al. | ................ | 280/740 |
| 5,899,495 A | 5/1999 | Yamamoto et al. | | |
| 5,957,485 A * | 9/1999 | Hirai | ................ | 280/729 |
| 6,241,283 B1 * | 6/2001 | Zarazua | ................ | 280/743.2 |
| 6,254,121 B1 * | 7/2001 | Fowler et al. | ............... | 280/729 |
| 6,260,877 B1 * | 7/2001 | Rasmussen, Sr. | ........... | 280/729 |
| 6,283,499 B1 * | 9/2001 | Nelsen et al. | ................ | 280/729 |
| 6,478,331 B1 * | 11/2002 | Lang | ........................ | 280/740 |
| 6,554,313 B2 * | 4/2003 | Uchida | ...................... | 280/729 |
| 6,612,609 B1 * | 9/2003 | Rodriguez et al. | .......... | 280/729 |
| 6,733,037 B1 * | 5/2004 | Keshavaraj | ............. | 280/743.2 |
| 7,144,036 B2 * | 12/2006 | Kai | ............................ | 280/731 |
| 7,210,702 B2 * | 5/2007 | Soderquist | .................. | 280/740 |
| 2007/0024040 A1 * | 2/2007 | Kai et al. | ................... | 280/740 |

* cited by examiner

*Primary Examiner*—Kevin Hurley
*Assistant Examiner*—Karen Amores
(74) *Attorney, Agent, or Firm*—Rankin, Hill & Clark LLP (57) ABSTRACT

The present invention provides an air bag device in which an airbag member can be quickly and positively inflated and expanded, with its central portion instantaneously inflated. The present invention describes an air bag device 10 in which an intermediate cloth of a polygonal shape, having a gas inlet port leading to an inflator, is disposed between a front-side cloth and a reverse-side cloth which are sewn together at their peripheral edge portions. Part of a peripheral edge portion of the polygonal intermediate cloth is sewn to the front-side cloth, and gas outlet ports are provided respectively at those portions or this peripheral edge portion which are not sewn to the front-side cloth. With this construction, an airbag member can be quickly and positively inflated and expanded, with its central portion instantaneously inflated.

15 Claims, 5 Drawing Sheets

AIR BAG DEVICE

The present invention claims foreign priority to Japanese patent application No. P.2005-219252, filed on Jul. 28, 2005, the contents of which is incorporated herein by reference.

BACKGROUND

1. Technical Field

This invention relates to an air bag device for protecting a passenger from an impact developing at the time of a frontal collision of a vehicle, and more particularly to an air bag device in which an airbag member can be quickly and positively inflated and expanded, with its central portion instantaneously inflated.

2. Related Art

There are known conventional air bag devices which reduce an impact acting on the passenger by supplementing an effect or a seat belt during the impact during a frontal collision of a vehicle exceeding a predetermined value. In such an air bag device, an airbag member is inflated and expanded by high-pressure gas and the passenger is protected from the impact by a cushioning effect of the inflated and expanded airbag member. This air bag device is mounted in a central portion of a steering wheel or in an instrument panel. Usually, the airbag member used in the air bag device is formed by superposing a reverse-side cloth of a circular shape (on which an inflator for generating gas at the time of a frontal collision is mounted) and a front-side cloth of a circular shape (which abuts against the passenger upon inflation and expansion of the air bag) together and then sewing the peripheral edge portions of the two cloths together.

For example, there is disclosed an air bag device including the type of airbag member in which an outer peripheral portion of a flat portion is folded back toward its central portion to form a folded-back portion, and this folded-back portion is sewn to the flat portion (see U.S. Pat. No. 5,899,495). In the air bag device disclosed in this U.S. Pat. No. 5,899,495, when gas flows into the airbag member, that portion of the airbag member disposed inwardly of the sewn portions projects a predetermined distance toward the passenger. Then, when the internal pressure of the airbag member increases, the sewn portions are opened, so that the folded-back portion is inflated and expanded laterally. Therefore, the airbag member can be expanded widely in a flattened manner at the front side of the passenger, while suppressing the inflation of the central portion thereof. And besides, the airbag member can be obtained merely by folding the ordinary airbag member at the predetermined portions thereof and then by sewing the folded portion, and therefore the production process can be simplified, and the production cost can be reduced.

However, in the air bag device disclosed in this U.S. Pat. No. 5,899,495, although the airbag member can be expanded widely in a flattened manner at the front side of the passenger, there are occasions when the inflation of the central portion is inadequate. And besides, the air bag is so constructed as to be inflated and expanded when the sewn portions are opened, and therefore the inflation and expansion of the airbag member are influenced by an opening condition of the sewn portions thereof, and therefore the reliability is inferior.

SUMMARY OF THE INVENTION

This invention has been made in view of the foregoing, and an object of the invention is to provide an air bag device in which an airbag member can be quickly and positively inflated and expanded, with its central portion instantaneously inflated.

The above object has been achieved by the present invention having the following features.

According to a first aspect of the present invention, there is provided an air bag device comprising:
an airbag member, and
an inflator that feeds gas into the airbag member to inflate and expand the airbag member;
wherein the airbag member comprises:
a front-side cloth,
a reverse-side cloth to which the inflator is mounted thereon, wherein a part of a peripheral edge portion of the reverse-side cloth is sewn to the front-side cloth, and
an intermediate cloth of a polygonal shape disposed between the front-side cloth and the reverse-side cloth, wherein the intermediate cloth comprising a gas inlet port that communicates to the inflator.

In the air bag device of the invention, when an impact developing at the time of a frontal collision of a vehicle is detected, gas is generated from the inflator. This gas is first fed into a space between the intermediate cloth and the front-side cloth. Therefore, at first, that portion of the airbag member which is enclosed by the intermediate cloth and the front-side cloth is inflated and expanded. Then, the gas flows into a space between the intermediate cloth and the reverse-side cloth via gas outlet ports provided respectively at those portions of the peripheral edge portion of the intermediate cloth which are not sewn to the front-side cloth. As a result, the portion enclosed by the intermediate cloth and the reverse-side cloth is inflated and expanded, and thus the whole of the airbag member is inflated and expanded.

In a conventional air bag device, the whole of an airbag member is inflated and expanded while discharging gas from a plurality of vent holes (gas discharge ports) formed in that portion of a reverse-side cloth disposed around an inflator. On the other hand, in the air bag device of the invention, the portion of the airbag member enclosed by the intermediate cloth and the front-side cloth is first inflated and expanded while discharging gas from the gas outlet ports provided respectively at the portions of the peripheral edge portion of the intermediate cloth which are not sewn to the front-side cloth. Naturally, the portion of the airbag member enclosed by the intermediate cloth and the front-side cloth is smaller in capacity than the whole of the airbag member, and therefore can be more quickly inflated and expanded. Therefore, the central portion of the airbag member can be instantaneously inflated, and the intended airbag surface can be quickly formed.

The gas flowing from the gas outlet ports (provided respectively at the portions of the peripheral edge portion of the intermediate cloth which are not sewn to the front-side cloth) is used for inflating and expanding the portion of the airbag member enclosed by the intermediate cloth and the reverse-side cloth, and thus the generated gas can be efficiently used for inflating and expanding the airbag member. Furthermore, the air bag device of the invention does not depend on the opening of the sewn portions as in the air bag device disclosed in U.S. Pat. No. 5,899,495, and therefore the airbag member can be positively inflated and expanded. Therefore, in the invention, there can be provided the air bag device in which the airbag member can be quickly and positively inflated and expanded, with its central portion instantaneously inflated.

According to a second aspect of the present invention, the peripheral edge portion of the polygonal intermediate cloth excluding a plurality of apex portions is sewn to the front-side cloth.

In the air bag device of the second aspect of the present invention, the peripheral edge portion of the polygonal intermediate cloth except the apex portions thereof is sewn to the front-side cloth, and the gas outlet ports are provided respectively at these apex portions which are not sewn to the front-side cloth. In this air bag device, the gas fed into the space between the intermediate cloth and the front-side cloth flows into the space between the intermediate cloth and the reverse-side cloth via the apex portions. Therefore, the portion enclosed by the intermediate cloth and the reverse-side cloth can be efficiently inflated and expanded subsequently to the inflation and expansion of the portion enclosed by the intermediate cloth and the front-side cloth.

According to a third or a fifth aspect of the present invention, the intermediate cloth has a substantially triangular shape.

According to a fourth or a sixth aspect of the present invention, the intermediate cloth has a substantially square shape.

According to a seventh aspect of the present invention, it may be adaptable that a periphery of the gas inlet port of the intermediate cloth is sewn to a periphery of a gas inlet port of the reverse-side cloth.

According to an eighth aspect of the present invention, it may be adaptable that the reverse-side cloth comprising pluralities of vent holes.

In the air bag devices of the third and fourth aspects, the intermediate cloth has the triangular shape or the square shape, and three or four gas outlet ports are provided. Thus, the number of the gas outlet ports is changed depending on the shape of the intermediate cloth, thereby limiting the amount of outflow of the gas. By doing so, the central portion of the airbag member can be more quickly inflated and expanded.

In the present invention, there can be provided the air bag device in which the airbag member can be quickly and positively inflated and expanded, with its central portion instantaneously inflated. Since the inflation and expansion can be quickened, the output of the inflator can be reduced, while maintaining an initial restraint force during a frontal collision. Therefore, a lightweight design of the inflator can also be expected.

DETAILED DESCRIPTION

Exemplary embodiments of the present invention will now be described with reference to the drawings. In the description of the second and third exemplary embodiments, explanation of those portions thereof similar in construction to those of the first exemplary embodiment will be omitted or simplified.

Figure 1:
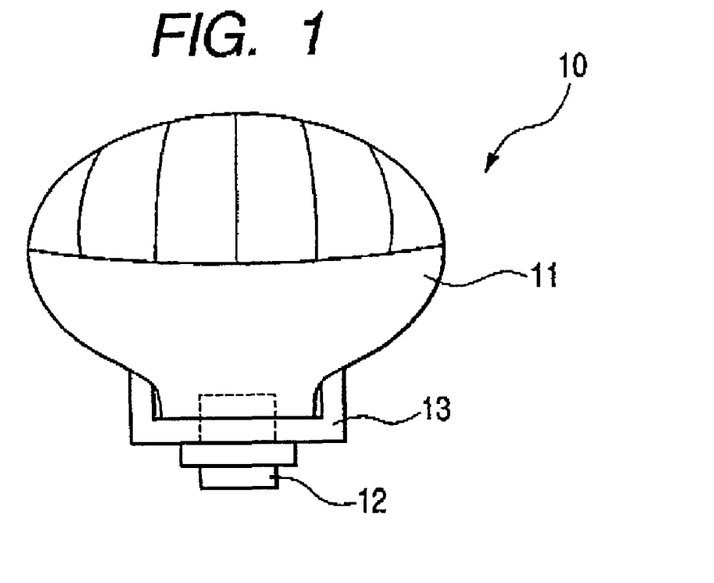
FIG. 1 is a side-elevational view of a first exemplary embodiment of an air bag device of the present invention in its inflated and expanded condition.

FIG. 1 is a side-elevational view of an air bag device 10 of the first exemplary embodiment in its inflated and expanded condition. The air bag device 10 is mounted on a steering wheel body (not shown) mounted on a distal end of a steering shaft (not shown) suitably adjustably tilted. The air bag device 10 is supported by a retainer 13 made of metal or other material, and a cover member (not shown) made of a synthetic resin is attached to this retainer 13. In this air bag device 10, an airbag member 11 is inflated by gas generated by an inflator 12 during a frontal collision of a vehicle and breaks the cover member. The member is expanded from a central portion of the steering wheel body toward a passenger compartment, thereby restraining the passenger so as to protect the passenger from an impact of the collision.

The air bag device 10 is comprised of the airbag member 11, and the inflator 12 that generates gas during a frontal collision of the vehicle and that feeds this gas into the airbag member 11 to inflate and expand it. The inflator 12 is provided in an opening formed in a central portion of the air bag device 10, and comprises an explosive for producing gas, and an electrically-operated ignition device for burning this explosive to generate the gas. The airbag member 11, held in a folded condition, is mounted gastight around the outer periphery of the inflator 12. The air bag device 10 further includes a sensor for detecting an impact developing at the time of a frontal collision of the vehicle and for outputting an ignition signal to the ignition device of the inflator 12.

Figure 2:
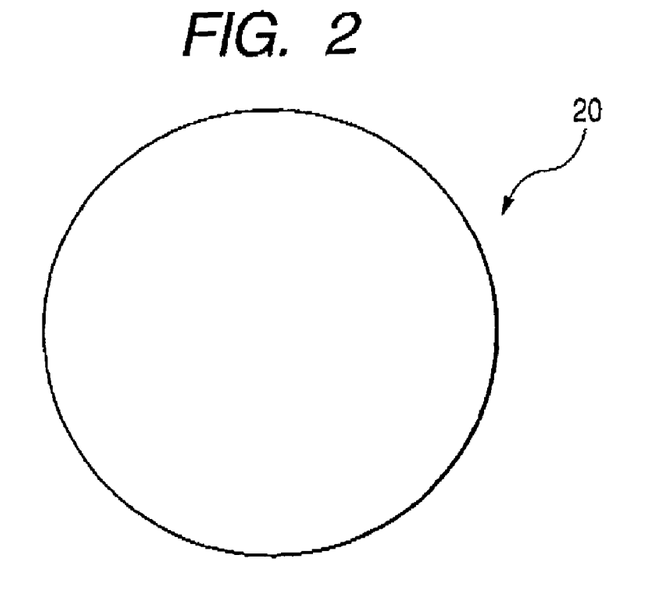
FIG. 2 is a plan view of a front-side cloth of an airbag member of the first exemplary embodiment.
Figure 3:
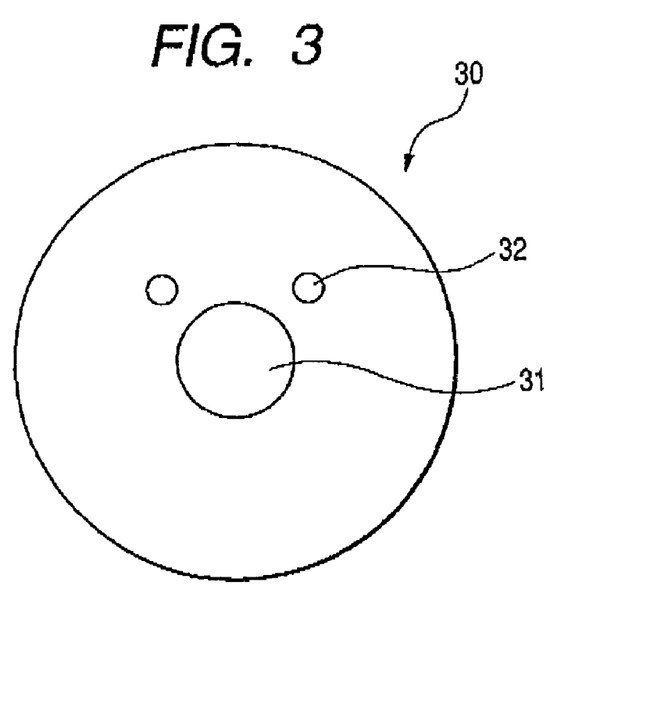
FIG. 3 is a plan view of a reverse-side cloth of the airbag member of the first exemplary embodiment.
Figure 4:
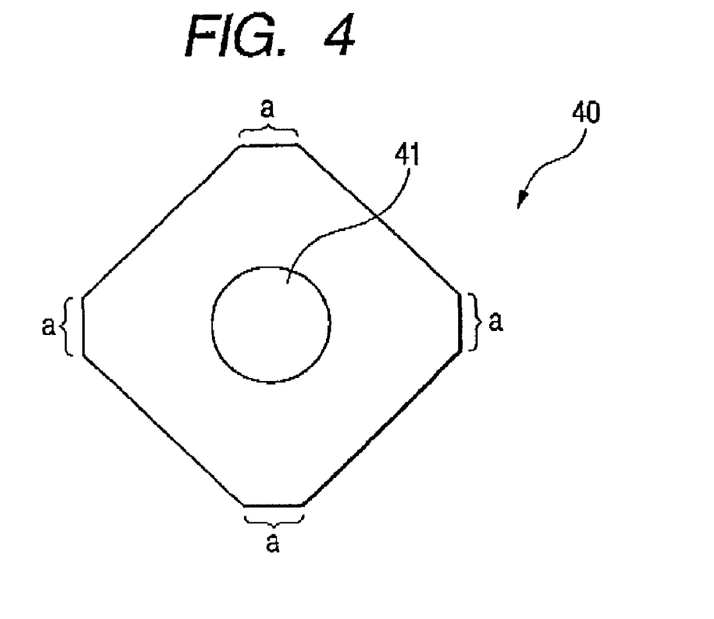
FIG. 4 is a plan view of an intermediate cloth of the airbag member of the first exemplary embodiment.

A feature of the air bag device 10 of this exemplary embodiment resides in the airbag member 11. The airbag member 11 of the first exemplary embodiment is formed by a flexible cloth having a coating formed thereon for preventing the permeation of gas. More specifically, the airbag member 11 comprises a front-side cloth 20 (see FIG. 2) of a circular shape, a reverse-side cloth 30 (see FIG. 3) of a circular shape which is sewn at its peripheral edge portion to the front-side cloth 20, and has the inflator 12 mounted thereon. An intermediate cloth 40 (see FIG. 4) of a generally square shape is disposed between the front-side cloth 20 and the reverse-side cloth 30. A gas inlet port 41 leading to the inflator 12 is formed through the intermediate cloth 40. Gas outlet ports are formed respectively at apex portions (that is, four corner portions) of the square intermediate cloth 40. The intermediate cloth 40 is sewn to the front-side cloth 20 at its peripheral edge portion except at its apex portions. Namely, the peripheral edge portion except the apex portions "a" (shown in FIG. 4) is sewn to the front-side cloth 20, and the gas outlet ports are formed by the respective apex portions "a" and the front-side cloth 20. Two vent holes 32 for discharging excess gas when the airbag member 11 is inflated and expanded are formed through that portion of the reverse-side cloth 30 disposed around the gas inlet port 31.

Figure 7:
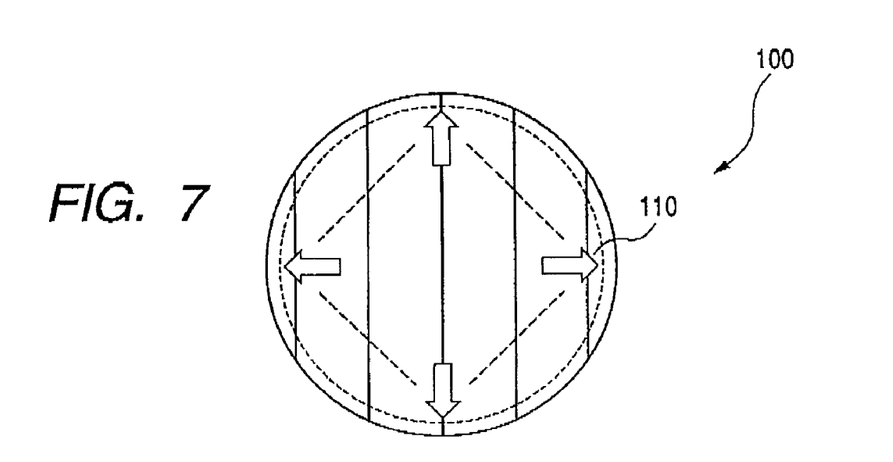
FIG. 7 is a schematic plan view of the air bag device of the first exemplary embodiment.

The operation of the air bag device 10 of the first exemplary embodiment will be described. First, when the sensor detects an impact produced in the event of a frontal collision of the vehicle, this sensor outputs an ignition signal to the inflator 12. The ignition device of the inflator 12 is activated in response to the outputted ignition signal to burn the explosive, so that the explosive produces high-pressure combustion gas. The gas produced is fed into the interior of the airbag member 11, and the thus fed gas flows through the gas inlet port 41 (formed in the intermediate cloth 40) into a space formed between the intermediate cloth 40 and the front-side cloth 20, so that that portion of the airbag member 11 enclosed by the intermediate cloth 40 and the front-side cloth 20 is instantaneously inflated and expanded. Thereafter, this gas flows into a space between the intermediate cloth 40 and the reverse-side cloth 30 via the gas outlet ports 110 (see FIG. 7), and the portion enclosed by the intermediate cloth 40 and the reverse-side cloth 30 is also inflated, so that the whole of the airbag member 11 is inflated and expanded.

Figure 5:
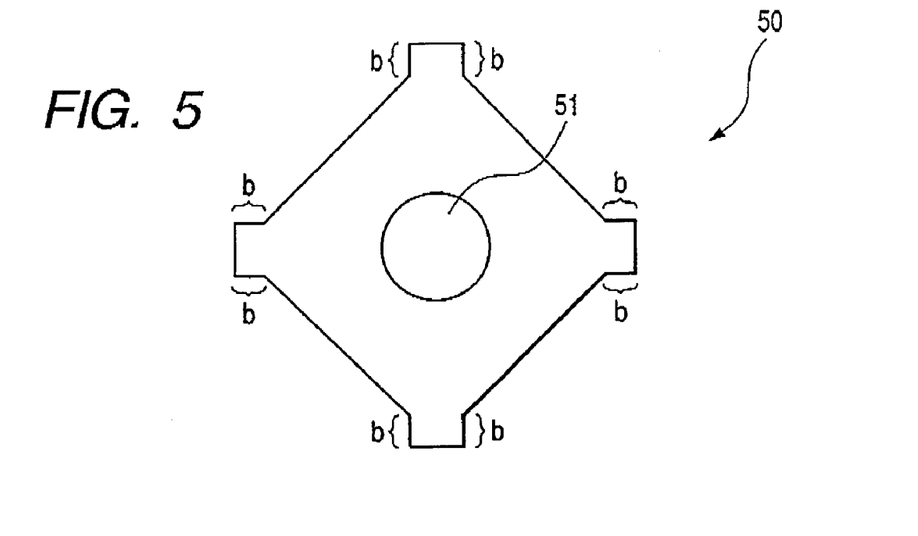
FIG. 5 is a plan view of an intermediate cloth of an airbag member of a second exemplary embodiment.

An air bag device of the second exemplary embodiment is similar in construction to the air bag device of the first exemplary embodiment except that an intermediate cloth of an airbag member has a substantially square shape and that apex portions of this intermediate cloth extend outwardly. FIG. 5 is a plan view of the intermediate cloth 50 of the airbag member used in the air bag device of the second exemplary embodiment. The intermediate cloth 50, having a gas inlet port 51, is sewn to a front-side cloth at its peripheral edge portion except at the apex portions "b" shown in FIG. 5. Gas outlet ports are formed by the respective apex portions "b" and the front-side cloth.

Figure 8:
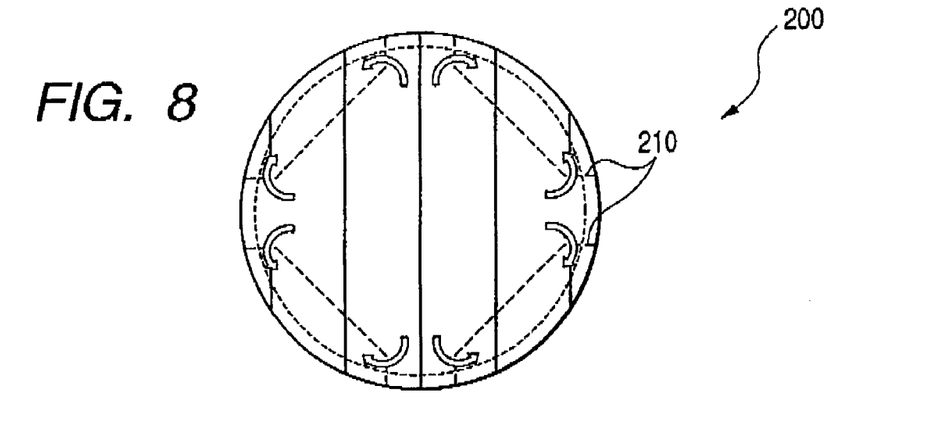
FIG. 8 is a schematic plan view of an air bag device of the second exemplary embodiment.

In the air bag device 200 of the second exemplary embodiment, the gas outlet ports 210 (see FIG. 8) are limited in size as compared with the air bag device of the first exemplary embodiment, and the amount of flow of gas from each gas outlet port 210 is limited. Therefore, in the second exemplary embodiment, a risk that the gas outlet ports 210 are expanded to a degree more than necessary is reduced.

Figure 6:
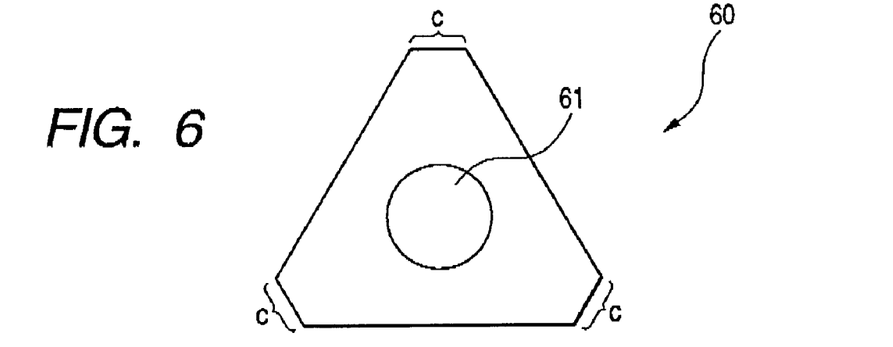
FIG. 6 is a plan view of an intermediate cloth of an airbag member of a third exemplary embodiment.

An air bag device of the third exemplary embodiment is similar in construction to the air bag device of the first exemplary embodiment except that an intermediate cloth of an airbag member has a substantially triangular shape. FIG. 6 is a plan view of the intermediate cloth 60 of the airbag member used in the air bag device of the third exemplary embodiment. The intermediate cloth 60, having a gas inlet port 61, is sewn to a front-side cloth at its peripheral edge portion except at its apex portions "c" shown in FIG. 6. Gas outlet ports are formed by the respective apex portions "C" and the front-side cloth.

Figure 9:
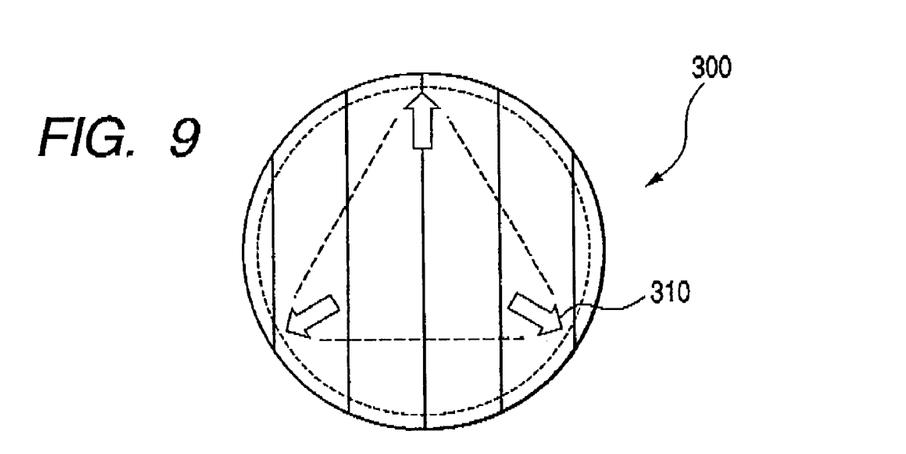
FIG. 9 is a schematic plan view of an air bag device of the third exemplary embodiment.

In the air bag device 300 of the third exemplary embodiment, the intermediate cloth 60 of the airbag member has the triangular shape, and therefore the number of the gas outlet ports 310 (see FIG. 9) is three. Thus there is one fewer gas outlet port as compared with the first and second exemplary embodiments each employing the intermediate cloth of the substantially shape. Therefore, the amount of flow of gas from the gas outlet ports 310 is smaller, and therefore a central portion of the airbag member can be more quickly inflated and expanded.

The air bag devices of the above exemplary embodiments are not limited to the type in which the airbag member is inflated and expanded from the steering wheel into the passenger compartment to restrain the driver in the driver's seat. It can also be of the type in which an airbag member is inflated and expanded from an instrument panel into the passenger compartment, thereby restraining the passenger in the passenger seat. Furthermore, in the air bag devices of the above exemplary embodiments, the inflator is not limited to the type utilizing combustion gas produced by the explosive, but can be of the type using high-pressure gas filled in a canister.

EXAMPLE

Next, the invention will be described in further detail by way of Example, but the invention is not limited to these examples.

Example 1

An airbag member of the first exemplary embodiment, having an intermediate cloth of a square shape, was produced using nylon fibers, and an air bag device incorporating this airbag member was prepared as Example 1. In this airbag device, known conventional members were used respectively in parts other than the airbag member. In order that the amount of discharge of gas can be fixed when evaluating an inflating and expanding condition of each airbag member, vent holes (formed through that portion of a reverse-side cloth disposed around a gas inlet port thereof) each had a diameter of 40 mm in both of Example 1 and Comparative Example 1.

An air bag device of Comparative Example 1 was prepared according to the same procedure as described above for Example 1 except that a conventional airbag member, formed by sewing a front-side cloth and a reverse-side cloth together without using an intermediate cloth, was produced using nylon fibers, and was incorporated in the air bag device.

Figure 10:
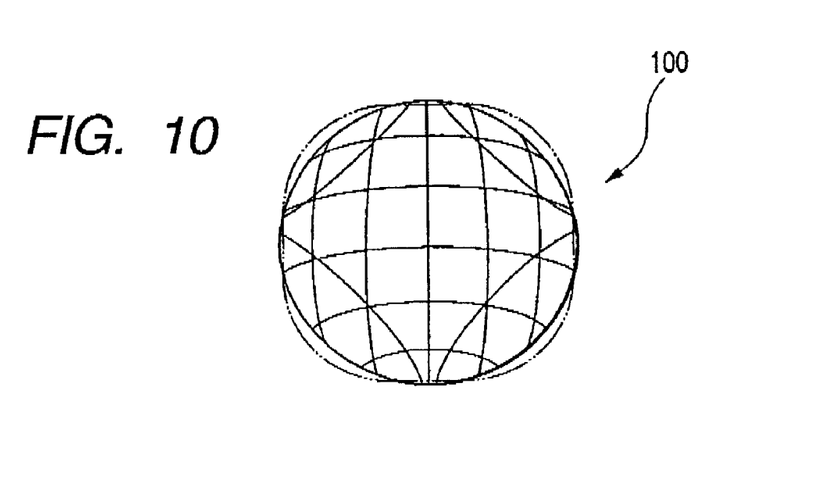
FIG. 10 is a plan view of an air bag device of Example 1 in its inflated and expanded condition.
Figure 11:
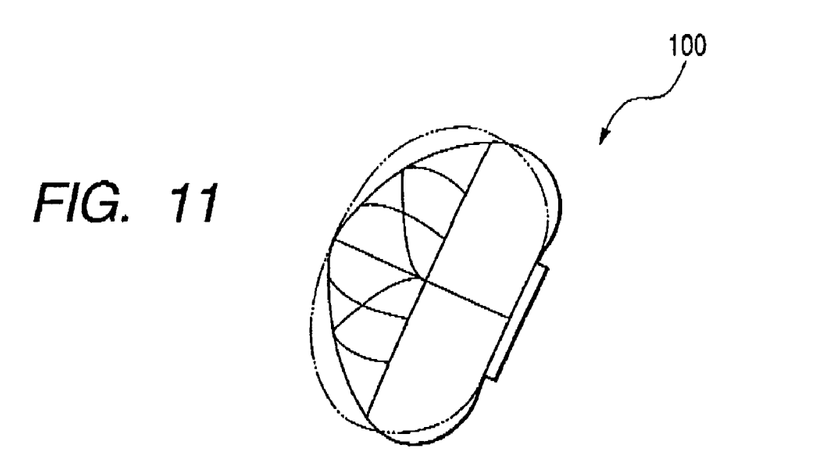
FIG. 11 is a side-elevational view of the air bag device of Example 1 in its inflated and expanded condition.
Figure 12:
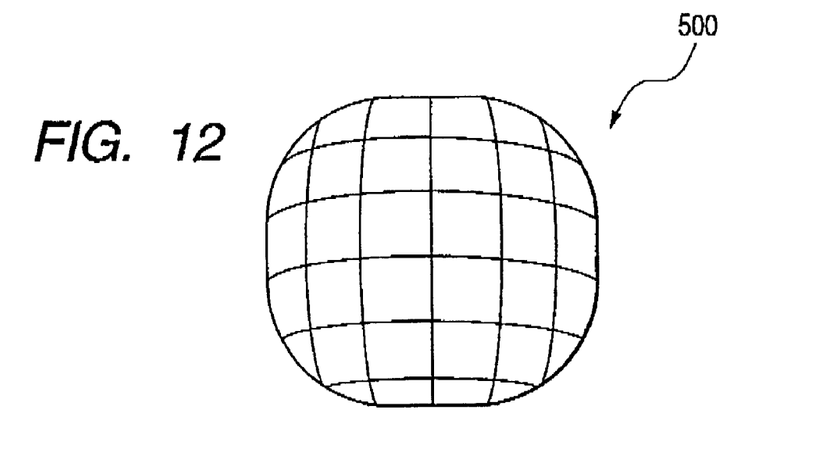
FIG. 12 is a plan view of an air bag device of Comparative Example 1 in its inflated and expanded condition.
Figure 13:
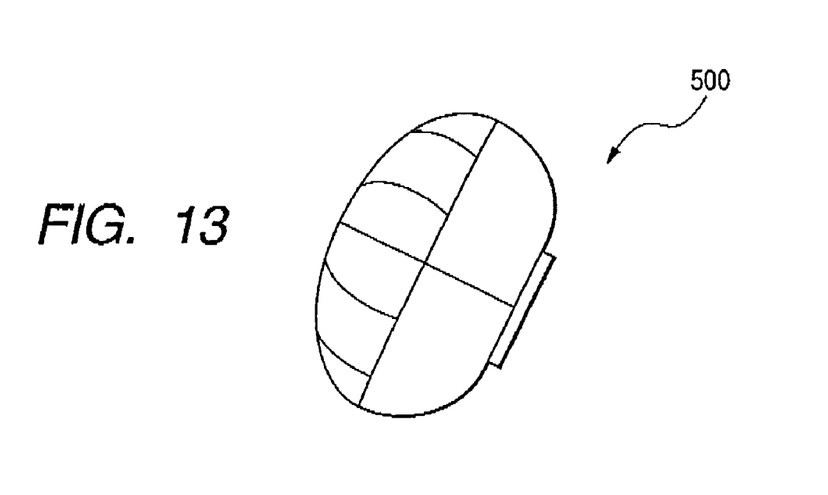
FIG. 13 is a side-elevational view of the air bag device of Comparative Example 1 in its inflated and expanded condition.

With respect to the air bag devices 100 and 500 of Example 1 and Comparative Example 1, an impact was applied to the front side of a vehicle, and the condition of inflating and expanding of each airbag member was evaluated by sight. FIGS. 10 and 11 show the airbag member of Example 1 in its inflated and expanded condition. FIGS. 12 and 13 show the airbag member of Comparative Example 1 in its inflated and expanded condition. As is clear from these Figures, it was confirmed that a central portion of the airbag member in the air bag device 100 of the invention (Example 1) was instantaneously inflated and expanded, and thereafter the whole of the airbag member was quickly and positively inflated and expanded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An air bag device comprising:
   an airbag member, and
   an inflator that feeds gas into the airbag member to inflate and expand the airbag member;
   wherein the airbag member comprises:
   a front-side cloth,
   a reverse-side cloth to which the inflator is mounted thereon, wherein a part of a peripheral edge portion of the reverse-side cloth is sewn to the front-side cloth, and
   an intermediate cloth of a polygonal shape disposed between the front-side cloth and the reverse-side cloth, wherein the intermediate cloth comprises a gas inlet port that communicates to the inflator, and
   wherein the polygonal intermediate cloth has a peripheral edge portion defining a plurality of apex portions and a plurality of sewn portions along said peripheral edge portion, and wherein said sewn portions are sewn to said front-side cloth so as to be fixed to said front-side cloth and said plurality of apex portions are unsewn and free to move relative to the front-side cloth so as to permit gas to flow from one side of the intermediate cloth, through a passageway defined by the apex portions and the front-side cloth, and into a space provided on a second side of the intermediate cloth.

2. The air bag device according to claim 1, wherein the intermediate cloth has a substantially triangular peripheral shape.

3. The air bag device according to claim 1, wherein the intermediate cloth has a substantially square peripheral shape.

4. The air bag device according to claim 1, wherein a periphery of the gas inlet port of the intermediate cloth is sewn to a periphery of a gas inlet port of the reverse-side cloth.

5. The air bag device according to claim 4, wherein the airbag member defines a first gas intake space in communication with a second gas intake space, wherein the first gas intake space is defined by the inflator, the front-side cloth, and the intermediate cloth, and the second gas intake space is defined by the intermediate cloth, the reverse-side cloth, and the front-side cloth, wherein the first gas intake space communicates with the inflator, and the second gas intake space communicates with the first gas intake space via the passageway defined by the apex portions and the front-side cloth.

6. The air bag device according to claim 1, wherein the reverse-side cloth comprises a plurality of vent holes.

7. The air bag device according to claim 1, wherein each of the plurality of apex portions is disposed between sewn portions.

8. The air bag device according to claim 7, wherein each of the plurality of apex portions are held near an inner surface of the front-side cloth by the sewn portions, which are sewn to the front-side cloth.

9. An air bag device comprising:

an airbag member, and an inflator that feeds gas into the airbag member to inflate and expand the airbag member;

wherein, the airbag member comprises:

a front-side cloth, a reverse-side cloth to which the inflator is mounted thereon, wherein a part of a peripheral edge portion of the reverse-side cloth is sewn to the front-side cloth, and an intermediate cloth disposed between the front-side cloth and the reverse-side cloth, wherein the intermediate cloth comprises a gas inlet port that communicates with the inflator, and a peripheral portion including sewn and unsewn regions, wherein the sewn regions are sewn to the front-side cloth and the unsewn regions are disposed between the sewn regions whereby the unsewn regions are free to move relative to the front-side cloth so as to permit gas to flow from a first side of the intermediate cloth to a second side of the intermediate cloth via a passageway defined by the unsewn regions and the front-side cloth.

10. The air bag device according to claim 9, wherein the intermediate cloth has a substantially triangular peripheral shape.

11. The air bag device according to claim 9, wherein the intermediate cloth has a substantially square peripheral shape.

12. The air bag device according to claim 9, wherein a periphery of the gas inlet port of the intermediate cloth is sewn to a periphery of a gas inlet port of the reverse-side cloth.

13. The air bag device according to claim 12, wherein the airbag member defines a first gas intake space in communication with a second gas intake space, wherein the first gas intake space is defined by the inflator, the front-side cloth, and the first side of the intermediate cloth, and the second gas intake space is defined by the second side of the intermediate cloth, the reverse-side cloth, and the front-side cloth, wherein the first gas intake space communicates with the inflator, and the second gas intake space communicates with the first gas intake space via the passageway defined between the unsewn region and the front-side cloth.

14. The air bag device according to claim 9, wherein the reverse-side cloth comprises a plurality of vent holes.

15. The air bag device according to claim 9, wherein the unsewn regions are held near an inner surface of the front-side cloth by the sewn regions.

* * * * *

UNITED STATES PATENT AND TRADEMARK OFFICE
CERTIFICATE OF CORRECTION

| | | |
|---|---|---|
| PATENT NO. | : 7,422,237 B2 | Page 1 of 1 |
| APPLICATION NO. | : 11/460441 | |
| DATED | : September 9, 2008 | |
| INVENTOR(S) | : Takeshi Kai et al. | |

It is certified that error appears in the above-identified patent and that said Letters Patent is hereby corrected as shown below:

On title page, section (57) Abstract, Line 11, please delete "or" and insert --of--

Signed and Sealed this

Thirtieth Day of December, 2008

JON W. DUDAS
*Director of the United States Patent and Trademark Office*